United States Patent
Rajgor et al.

(10) Patent No.: US 12,488,092 B2
(45) Date of Patent: Dec. 2, 2025

(54) USING ROOT-OF-TRUST (ROT) TO CONTINUOUSLY MONITOR DEVICE OPERATION FOR IMPAIRMENT

(71) Applicant: Cisco Technology, Inc., San Jose, CA (US)

(72) Inventors: Samir Valjibhai Rajgor, Santa Clara, CA (US); Sachin Agarwal, Fremont, CA (US); Srinivas Vundru, Cary, NC (US); Tatiana Serguei Dorofeeva, Sunnyvale, CA (US); Chirag Shroff, Cary, NC (US); Srirajkumar Sundararaman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 118 days.

(21) Appl. No.: 18/437,938

(22) Filed: Feb. 9, 2024

(65) Prior Publication Data
US 2025/0258908 A1    Aug. 14, 2025

(51) Int. Cl.
*G06F 21/00*       (2013.01)
*G06F 21/54*       (2013.01)
(Continued)

(52) U.S. Cl.
CPC ............ *G06F 21/54* (2013.01); *G06F 21/575* (2013.01); *G06F 21/72* (2013.01)

(58) Field of Classification Search
None
See application file for complete search history.

(56) References Cited

U.S. PATENT DOCUMENTS 12,367,124 B2 * 7/2025 Andrews .............. G06F 11/0778
2009/0319782 A1 * 12/2009 Lee ......................... G06F 21/34
713/172

(Continued)

OTHER PUBLICATIONS

Noorian, Zeinab et al. Trust Mechanism for Enforcing Compliance to Secondary Data Use Contracts. 2014 IEEE 13th International Conference on Trust, Security and Privacy in Computing and Communications. https://ieeexplore.ieee.org/stamp/stamp.jsp?tp=&arnumber=7011290 (Year: 2014).*

(Continued)

*Primary Examiner* — Jeremiah L Avery
(74) *Attorney, Agent, or Firm* — Lee & Hayes, P.C.

(57) ABSTRACT

A method for monitoring an Integrated Circuit (IC). The method includes a Root-Of-Trust (ROT) module to actuate a monitoring process to monitor at least one feature being performed in ongoing operations of the IC in accordance with a policy. The ROT module receives data that defines the policy that includes at least one feature being performed. A validating process is applied by the ROT module to data by using firmware and by using at least one built-in key of a plurality of built-in keys retrieved from a secure storage. The ROT module determines whether at least one feature is being performed in the ongoing operations of the IC in compliance with the policy. The ROT module applies an impairing process to impair at least one feature of the plurality of features being performed to attempt to place the performance of the ongoing operations of the IC in compliance with the policy.

20 Claims, 10 Drawing Sheets

(51) Int. Cl.
  *G06F 21/57* (2013.01)
  *G06F 21/72* (2013.01)

(56) References Cited

U.S. PATENT DOCUMENTS

| | | | | |
|---|---|---|---|---|
| 2010/0189262 | A1* | 7/2010 | Ducharme | H04N 21/4183 |
| | | | | 706/47 |
| 2012/0102334 | A1* | 4/2012 | O'Loughlin | H04L 9/3252 |
| | | | | 713/189 |
| 2015/0304736 | A1* | 10/2015 | Lal | H04N 21/64715 |
| | | | | 380/210 |
| 2017/0093853 | A1* | 3/2017 | Boivie | G06F 21/00 |
| 2017/0235967 | A1* | 8/2017 | Ray | G06F 21/56 |
| | | | | 713/165 |
| 2017/0364685 | A1* | 12/2017 | Shah | G06F 21/575 |
| 2018/0034793 | A1 | 2/2018 | Kibalo et al. | |
| 2018/0039795 | A1* | 2/2018 | Gulati | H04L 63/0823 |
| 2018/0041341 | A1* | 2/2018 | Gulati | H04L 9/0894 |
| 2018/0097639 | A1* | 4/2018 | Gulati | G09C 1/00 |
| 2018/0198628 | A1 | 7/2018 | Hojsik et al. | |
| 2019/0363894 | A1* | 11/2019 | Kumar Ujjwal | H04L 9/3268 |
| 2020/0310662 | A1 | 10/2020 | Staab et al. | |
| 2021/0089685 | A1 | 3/2021 | Cheruvu et al. | |
| 2021/0319139 | A1 | 10/2021 | Ruan et al. | |
| 2022/0067127 | A1 | 3/2022 | Covolato et al. | |
| 2022/0171648 | A1* | 6/2022 | Rodriguez | G06F 9/45533 |
| 2022/0237333 | A1 | 7/2022 | Peng et al. | |
| 2022/0360594 | A1* | 11/2022 | Cosgrove | H04L 63/1416 |
| 2023/0083979 | A1 | 3/2023 | Mitchell et al. | |
| 2023/0351056 | A1* | 11/2023 | Marando | G06F 21/72 |
| 2024/0022609 | A1* | 1/2024 | Smith | G06F 9/5088 |
| 2024/0143758 | A1* | 5/2024 | Yim | G06F 21/565 |
| 2024/0152620 | A1* | 5/2024 | Marando | G06F 21/602 |
| 2024/0250953 | A1* | 7/2024 | Robison | H04L 63/20 |
| 2025/0061201 | A1* | 2/2025 | Das | G06F 21/572 |

OTHER PUBLICATIONS

St. Clair, Luke et al. Establishing and Sustaining System Integrity via Root of Trust Installation. Twenty-Third Annual Computer Security Applications Conference (ACSAC 2007). https://ieeexplore.ieee.org/stamp/stamp.jsp?tp=&arnumber=4412973 (Year: 2007).*

Search Report and Written Opinon for International Application No. PCT/US2025/014830, Dated Mar. 27, 2025, 14 pages.

* cited by examiner

USING ROOT-OF-TRUST (ROT) TO CONTINUOUSLY MONITOR DEVICE OPERATION FOR IMPAIRMENT

TECHNICAL FIELD

The present disclosure relates generally to chip-based security. Specifically, the present disclosure relates to systems and methods for using a Root-Of-Trust (ROT) for at least monitoring and impairing chip functionalities in accordance with licensed features.

BACKGROUND

An application-specific integrated circuit (ASIC) generally refers to an integrated circuit designed for a specific purpose. An ASIC tends to be quite efficient at performing the specific purpose for which it was designed as opposed to general-purpose circuits, like General Processing Units (GPUs) or Central Processing Units (CPUs), which can perform many different functions, but often less efficiently. A product may include a number of ASICs. As one example, the product could be a switch or a router that includes different ASICs to support different protocols. Other ASICs could be included for other purposes.

To prevent attacks, a private key is placed in a nonvolatile electrically erasable programmable read-only memory (EEPROM) (or battery-backed static random-access memory (SRAM)) and uses hardware cryptographic operations such as digital signatures or encryption. The non-volatile memory is often vulnerable to invasive attack mechanisms. The protection against such attacks may require the use of active tamper detection/prevention circuitry which must be continually powered.

Different types of device tampering may occur and include attempts to unauthorizedly modify a device's capability from a lower-end product to a higher-end product, and or gain the unlawful possession of a device from a manufacturer to circumvent sales channels to sell or resell it to the customer at a lower price. Maintaining the authenticity of a device is vital for customer assurance and to ensure the reliability of the device itself. For example, a device may be used to support critical network functions such as in power grid applications requiring an expected guaranteed level of performance. The unauthenticated device can be susceptible to security intrusions that can degrade the device's performance and may result in network outages. Other examples caused by an unauthenticated or counterfeit device are operational issues at customer ends that can result from software updates during a device's lifecycle, and which can also negatively and unfairly affect a vendor's reputation.

In various embodiments, it is desired to enable systems and methods to be implemented to target the use of a Root-Of-Trust (ROT) to continuously monitor the operations of an Integrated Circuit (IC) (e.g., ASIC) or other device, and enforce a policy based on the operations being performed.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
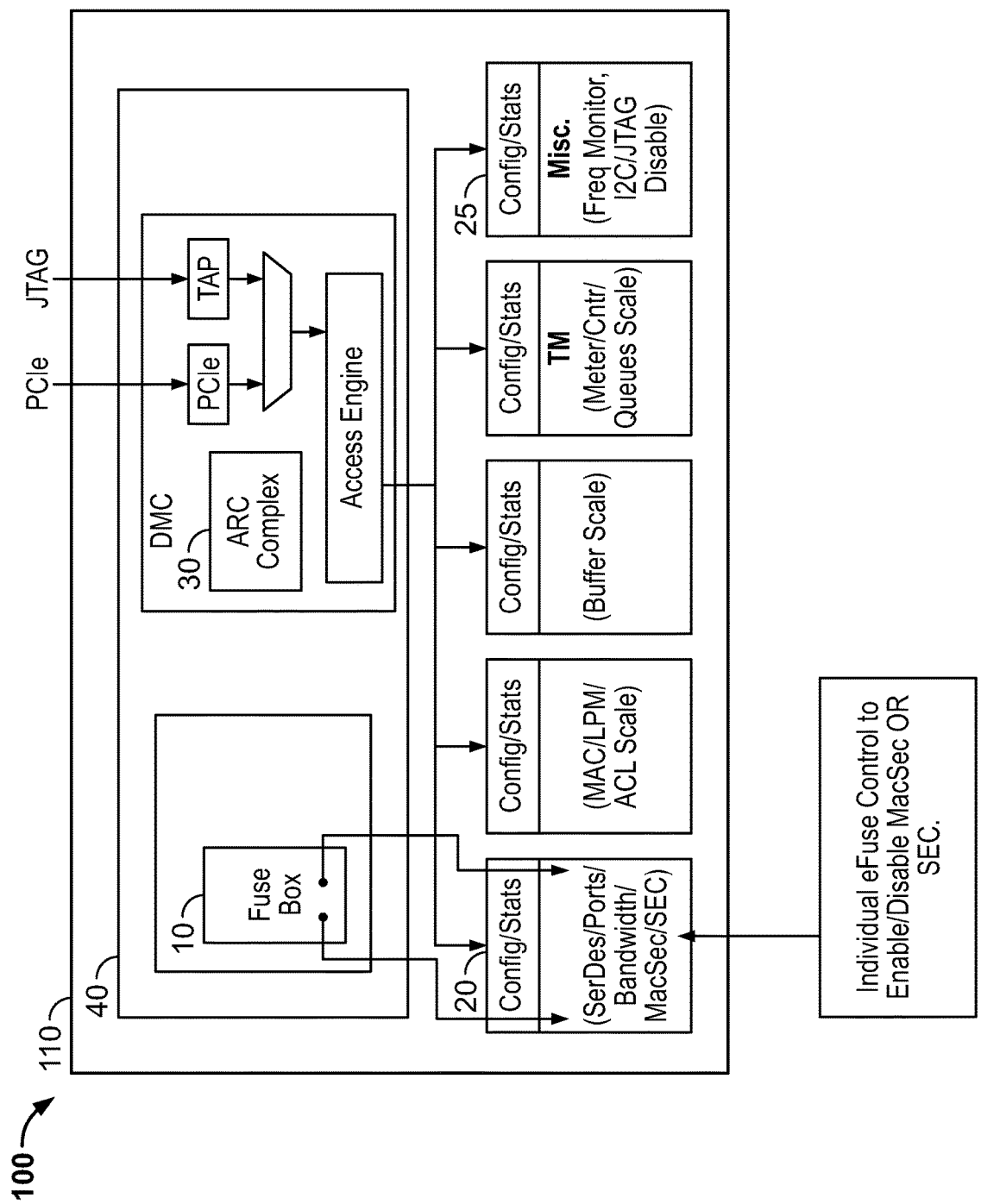
FIG. 1 illustrates different configurations of electrically programmable fuse (eFuse) controls that enable or disable Media Access Control Security (MacSec) or Security (Sec) of the Integrated Circuit (IC) or the system-of-chip (SOC) according to some embodiments

This disclosure describes techniques for implementing a method of using a Root-Of-Trust (ROT) to continuously monitor the operations of an Integrated Circuit (IC) (e.g., such as an Application-Specific Integrated Circuit (ASIC)) or other device, to ensure that the operations of the IC confirm to a policy (e.g., a licensed specification) based on the operations being performed.

In some embodiments, methods, and systems are enabled in a zero-trust environment with a light-weight control that may be implemented. The methods and systems configured may be implemented to target the use of the ROT for implementing a continuous monitoring system of the operations of at least the IC and to enforce a policy based on the operations that are currently being performed. For instance, if the operations are out of line with a defined policy, the ROT is enabled to disable certain features or impair the IC to not perform certain functionalities.

In some embodiments, methods, and systems are provided for monitoring an Integrated Circuit (IC) that is actuated by a Root-Of-Trust (ROT) module operably configured with the IC using a monitoring process to monitor one or more features being performed in ongoing operations of the IC in accordance with a policy. The ROT module may receive data such as policy data that defines in part the policy of a specification that may include one or more of the features being performed in the ongoing operations of the IC. The policy data may be installed in memory at the IC accessible by the ROT module or may be received from a host and accessed by the ROT module. The ROT module may apply a validating of the data by using instructional code from firmware accessed by the ROT module and by using at least one built-in key of a plurality of built-in keys retrieved from a secure storage. The ROT module may determine based in part on the validation of data received, whether one or more features that are being performed in ongoing operations of the IC comply with the policy. The ROT module may apply an impairing process to impair one or more features being performed, to respond to a determination that the policy is not in compliance, and to attempt to place the performance of ongoing operations of the IC in compliance with the policy.

In some embodiments, the ROT module may actuate the monitoring process during a boot-up of the IC, or in ongoing operations of the IC. The monitoring process may be performed in a continuous monitoring manner to monitor one or more features or may be performed in a periodic monitoring manner to monitor one or more features in the ongoing operations of the IC.

In some embodiments, the monitoring process may be configured as a passive monitoring process or a non-passive monitoring process that is actuable by the ROT module.

In some embodiments, the monitoring process may be executed using an algorithm, a script, or routine that is actuable by a request or call from the ROT module, and the algorithm, script, or routine may be configured to enable the monitoring of one or more features being performed in ongoing operations of the IC.

In some embodiments, the IC is configured as a System-On-a-Chip (SOC) or an Application-Specific Integrated Circuit (ASIC).

In some embodiments, the ROT module is configured to receive at least one of new data or updated data related to the policy from a host during a boot-up feature of the IC or in ongoing operations of the IC for determining compliance with features being performed by the IC.

In some embodiments, a built-in key accessed by the ROT module comprises an electrically programmable fuse (eFuse) configured during manufacturing of the IC, wherein the eFuse is actuable by the ROT module to impair at least one feature of the IC during ongoing operations of the IC.

In some embodiments, the impairing process that is implemented includes impairing one or more features of the IC to configure the IC to operate in a different mode such as a lightweight mode, which may include a subset of the features being performed in which the subset of features being performed comply with the policy.

In some embodiments, the IC is impaired by the ROT to operate with a constraint of one or more frequencies that are being performed in ongoing operations of the IC, or a limitation of the use or a restriction of a port of a set of ports enabled for ongoing operations of the IC. The data related to the policy can be locally encrypted and stored, or cloud accessible, and is readable by firmware stored in memory by the ROT module.

In some embodiments, the method is described that uses a ROT to enable monitoring processes that continuously monitor the device operations to impair functionals or operations that are not within a policy, license, or specification subscribed. This includes monitoring the operations of the IC or other devices and enforcing a certain policy based on the operations being performed. As mentioned, if the operations are out of line with a defined policy, the ROT disables certain features or impairs the IC. The ROT, as an example, can monitor the clock to determine the frequency (frequency monitor), and if the clock is out of line with the desired frequency, then the ROT takes various actions such as resetting the device. The ROT is configured in an isolated execution environment within the IC that boots from an immutable code in mask Read Only Memory (ROM) that is cryptographically personalized to each ASIC. It can be configured to prevent the IC from performing its core function until two requirements are met, by the ROT (e.g., prevent switching packets operations). The two requirements are as follows: A First Requirement is that the ROT is able to find and authenticate an issued identity in the form of a certificate (e.g.: X.509 certificate, similar to a Secure Unique Device Identifier (SUDI) certificate and conveys the fact that it is an ASIC identity rather than a system identity, stored in the IC (or ASIC) companion Serial Peripheral Interface (SPI) flash). The Second Requirement is that the ROT is able to verify that the certificate is on the same Printed Circuit Board Assembly (PCBA) as a Trust Anchor Module (TAM) and is paired with the PCBA at the time of manufacture. The verification is achieved by a host software facilitating a challenge/response from the ASIC ROT to the system TAM for the SUDI certificate. The SUDI certificate contains all ASIC Electronic Chip IDs (ECIDs) such that the ASIC ROT authenticates it and extracts the ECID from the SUDI certificate to verify its consistency with a local ECID.

In some embodiments, one or more methods may be established for the continuous monitoring of one or more built features of the ASIC utilizing a Root of Trust (ROT) code in a zero-trust environment of a device that securely configures the ASIC based on one or more licensed codes. For example, The ROT code may receive a licensing code from a host during bootup or may be configured one time as part of an authenticated ROT forward (firmware) image. The firmware with the ROT code may then validate the incoming licensing code with built-in keys from a secure storage such as a fuse box. The ROT code may configure a set of on-chip resources to achieve a desired licensing (e.g., it may disable hardware-accelerated crypto so that licensed code-based IC or ASIC can be exported), and the ROT code may continuously or periodically monitor and enforce the characteristics of the ASIC operations (e.g., enforce licensed bandwidth, and/or enable/disable crypto acceleration). In some embodiments, the evaluation of the license and enforcement occurs using the same isolated trusted code segment where a passive device evaluates the license with usage and operates an operating system (OS).

In some embodiment, the ROT code is implemented to enforce in the hardware of a system-on-chip, the licensed code using cryptographic controls. For example, the same die or package containing the IC or ASIC and/or system-of-chip are controlled by eFuses that are burnt during the manufacturing process of the die. The eFuses may be configured to contain different part numbers and/or other part-specific identifiers (customer ID or versions) to enable or disable resources for one or more feature sets of each IC, ASIC, or system-of-chip configuration. For example, the features of a feature set are controlled by the CPU-specific ROT and firmware with an authentication built-in key that is securely stored. The features are controlled by eFuses by physically disabling features of the IC, ASIC, or system-of-chip without software. This enables different IC or ASIC packages to be used based on each license or policy subscribed.

Additionally, the techniques described in this disclosure may be performed as a method and/or by a system having non-transitory computer-readable media storing computer-executable instructions that, when executed by one or more processors, perform the techniques described above.

Example Embodiments

In the examples described herein, a hardware root-of-trust (HWROT) may be enabled without a trusted platform (TPM) where the HWROT implements features of the IC using licensing data received from a host or configured in memory that is validated by the eFuse built-in keys. The licensed specification of the IC is enabled with the ROT which is equipped in the IC with an internal HWROT. The HWROT uses a read-only platform with programmed read-only cryptographic keys that enable features such as a secure boot with firmware.

In some embodiments, the firmware of the secure boot may be configured to enable a monitoring script or software that can monitor operations and operating features of the IC during ongoing operations and ensure that certain features during operations conform to a licensed specification that is subscribed or implemented for the IC.

In some embodiments, the IC may be configured in a package that can operate in one or more different modes of operation that are dependent on licensed features or impaired features of a specification that is being subscribed. For example, the package may be configured to operate in different modes of operation based on the licensed features in accordance with a specification that defines the operations of the IC.

In some embodiments, an eFuse mechanism can be associated with different licensing information such as part numbers for configuring different licensed specifications of IC; for example, to enable a subset of feature sets during ongoing operations of the IC.

In some embodiments, to prevent attacks, physically unclonable functions (PUFs) primitive may be used for authentication and secret key storage without requiring secured EEPROMs and associated costly hardware. This is possible because instead of storing codes in the digital memory, PUFs derive a secret from the physical characteristics of the integrated circuit (IC).

In some embodiments, enforcement of the license is enabled in hardware using cryptographic controls, where the same package (e.g., the package doesn't change) features that are controlled by the license which is monitored during ongoing operations and uses eFuse containing different parts numbers and/or other means (like customer ID or version) to enable the features (which is more secure than using a Software Development Kit (SDK) to configure the keys). The features are controlled by the eFuses by physically disabling the features without software that is secure (though may be deemed less flexible). The features are controlled by the ROT and the firmware with an authenticated feature key (that is both secure and flexible), and different packages are used based on different licenses (e.g., more like binning, partial goods, combination, etc.).

In some embodiments, eFuses, a True Random Number Generator, and a CPU (e.g., ARC®) complex with ROM are configured to secure the license (or a license code in the ROT).

In some embodiments, device-tracking can be enabled with the Root of Trust (ROT) in silicon devices. The ROT is at no time turned off and operates in a zero-trust environment (e.g., in an isolated ROT CPU complex contained in the IC). The IC's Root-of-Trust assists in generating a random key that is both unique and device-specific and can be used to authenticate the device during the device power-up. The process flow also entails enabling an eFuse mechanism with a true random number generator (TRNG) based mechanisms to generate unique and reproducible device-specific random numbers for crypto security encryption.

In some embodiments, the Root of Trust (ROT) is an isolated executable code within the IC that boots from immutable code in mask ROM and is cryptographically personalized to an IC such as an ASIC and can prevent the ASIC from performing its core function (e.g., switching packets) until certain requirements are met. The ROT must be able to find and authenticate an issued identity in the form of an X.509 certificate, similar to a Secure Unique Device Identifier (SUDI) certificate in format but different in content. The ASIC identity rather than a system identity is stored in the ASIC's companion SPI flash. This is enabled so that if the ASIC is lost or stolen in the supply chain before it is mounted on PCBs and provisioned with identities, it still cannot be enabled (e.g., used by a counterfeiter). In some embodiments, the ROT code is configured to be able to verify that it is on the same PCBA as a Trust Anchor and that it was paired at the time of manufacture. This is achieved by the host software facilitating a challenge/response from the ASIC ROT to the system Trust Anchor module for the latter's SUDI certificate, which contains all ASIC ECIDs in the same system as provisioned during manufacturing, such that the ASIC ROT can authenticate it and subsequently extract the ECID from the SUDI cert to verify its consistency with its local ECID. If these two cryptographic checks pass, a Silicon ASIC with an ROT will be enabled to serve its core function.

In some embodiments, because the IC has built-in ROT functionality, it can be used to enable cryptography to evaluate itself in a required operability including what features it should constrain, etc. The ROT can control the IC functionality and can be used to constrain or enable IC functionalities based on licenses. The ROT receives a license (or code) from a host or connected platform during boot-up, or the license (or policy) is provisioned when the IC is shipped. The licensing code is implemented during bootup and can be time or cycle-configured depending on the requirements. In some embodiments, the license code can be a one-time code that is used as part of the authentication or provisioning of the IC. For example, as part of the authentication ROT forward image. The ROT firmware can validate the code with built-in keys or can be configured to send a request to a third-party site for validation. The ROT during the bootup can automatically configure functions, parameters, and resources on the IC (e.g., the chip) to achieve the requirements of a particular license.

In some embodiments, the ROT can include functions embedded such as a watchdog monitor or timer, to monitor the operational characteristics of components enabled in the ASIC under the license. Also, the ROT can disable functions in the IC based on the license code. For example, the eFuse can be triggered by the ROT for the one-time disablement of functions. The ROT can control the processor throughput, for example, configure higher processing rates dependent on the jurisdiction of use, to abide by respect export regulations. In this case, using the ROT to enable enforcement from an isolated trusted code, is not susceptible to hacking or license subversion. Also, with the ROT, the same package can be used and is not required to be changed with different license codes. The SDK can use eFuse with different part numbers that physically disable IC operational features, but this is less flexible than software that implements controls such as can be configured from the ROT and firmware with an authentication feature. Different packages based on different licenses can also be implemented (e.g., an on-demand configured IC).

Examples described herein also provide a computing device that may include a CPU (e.g., ARC® processor) or ASIC which is isolated and secure non-transitory computer-readable media storing instructions of the ROT that when executed by the processor, cause the processor to perform several operations.

Turning now to the figures, FIG. 1 illustrates different configurations of eFuse controls that enable or disable MacSec or Sec of the SOC 40 in some embodiments. In FIG. 1, the eFuse mechanism 100 is shown which in an embodiment, is configured in a device 110 manufacturing and is used to establish the device 110 authenticity before traffic is initiated on the device. In some embodiment, the eFuse mechanism 100 is enabled to configure a chip-specific keying material package (CSKMP), that consists of generating device-specific and unique random numbers, which are kept encrypted and used as symmetric keys for device authentication. The device 110 specific keys are encapsulated in the CSKMP with vendor-provided public key and may be accessible by a vendor backend in a secured environment. The secure environment can include chip-specific databases that are used to create a chip-level identity information package (CLIIP). In some embodiments, the vendor backend will create a new certification for the device 110 used with a product identifier (Product ID (PID)). In some embodiments, the new certificate will be sent to device 110 and installed in FLASH memory integrated with the IC (e.g., CPU (or ARC® complex) 30) of device 110.

In some embodiments, the eFuse mechanism 100 can be implemented with a one-time programmable (OTP) to control the functionality of resources of a system on a chip (SoC) 40. The eFuse mechanism 100 is programmed to contain one or more secure keys (e.g., built-in keys) contained in the fuse box 10 during manufacturing and not after production. The eFuse mechanism 100 can itself configure the control of the Media access control security (Mac Sec) for authentication and encryption of traffic over Ethernet on Layer 2 LAN networks (config/stats module (CIFG) 20, and config/stats (Misc.) 25). The eFuse mechanism can ensure that a secure boot mechanism starts its root of trust (ROT) by setting up one or more keys (e.g., a private-public key pair (asymmetric) or also 2 private keys (symmetric)) into the semiconductor device 110 during the manufacturing process of the chip vendor. In some embodiments, the IC (e.g., CPU complex 30) will use different authentication keys where a random number is generated from a true random number generator (TRNG) (non-NIST compliant) and is written in eFuses (e.g., the eFuse mechanism 100) with the assistance of firmware.

In some embodiments, the ROT can monitor the clock (frequency monitor) to determine the clocking frequency of certain ongoing operations, and if the clock is out of line with a frequency that is defined by an operating licensed specification of the IC (e.g., CPU (or ARC® complex) 30).

In some embodiments, other than the built-in keys, the eFuses can be configured to store device security related to control and status bits. These are optional and dependent on the firmware and whether it is required to use the other features.

Figure 2:
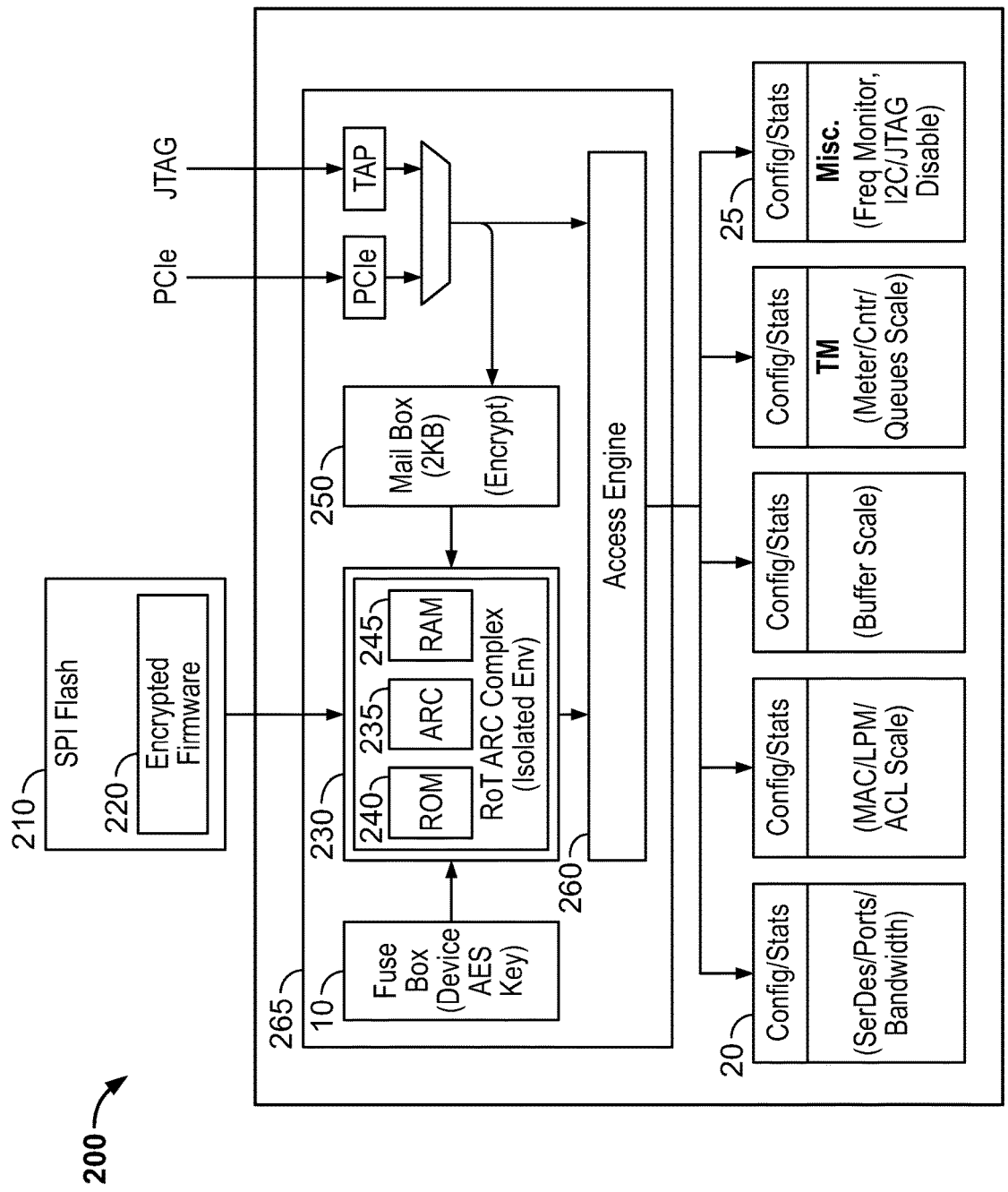
FIG. 2 illustrates a system architecture diagram of a Root of Trust (ROT) CPU complex that is isolated and encrypted to receive encrypted firmware and to program different device configurations based on the policy, or licensed specification, and operate in accordance with settings configured with eFuse controls that enable or disable various MacSecs/Secs of the SOC or device according to some embodiments.

FIG. 2 illustrates a system architecture diagram of a Root of Trust (ROT) CPU complex that is isolated and encrypted to receive encrypted firmware and to program different device configurations based on the policy, or licensed specification, and operate in accordance with settings configured with eFuse controls that enable or disable various MacSecs/Secs of the SOC or device.

As depicted in FIG. 2, an isolated Root of Trust (ROT) CPU Complex 230 is configured to operate in a zero-trust environment of device 200. In some embodiments, an isolated ROT CPU Complex 230 is configured that provides a security perimeter to protect the CPU processor (e.g., ARC® processor) 235, and the IC (e.g., an ASIC), that runs secured firmware 220 in the runtime memory. In some embodiments, the firmware 220 is encrypted firmware configured with serial peripheral interface (SPI) Flash memory (e.g., the SPI flash can be used to store a bootable firmware and is explicitly accessible by sending commands from instructions configured in the ROT code). The ROT code may be input during the device manufacturing process and may include information from the digital birth certificate that enables the device 200 (e.g., device enablement information that has been previously programmed into a hardware component during the manufacture of the device 200).

The secure CPU processor 235 may be programmed so that information based on different licenses or licensed information received from a host can be used for different packages of SOCs 265. The CPU processor 235 can include specific cryptographic and computational hardware to facilitate the processing of cryptographic information (e.g., the different licensing codes). The secure system (e.g., the isolated ROT CPU Complex 230) can configure the features of the (programmable) device 200 with ROT code executed in secure read-only memory (ROM) 240 and randomly accessible memory (RAM) 245 with the instructed CPU processor 235 accessing the built-in keys from secured storage of the fuse box 10 to create or monitor multiple final device 200 type configurations. Each of the final device 200 configurations can be identified as having different properties that are continuously monitored and decrypted by the built-in keys.

In implementations, the ROT code can be configured to never be turned off as it operates in a zero-trust environment (e.g., the isolated ROT CPU Complex 230 and received keys eFused from the fuse box 10, and instructions from the mailbox 250 which are encrypted). The ASIC (CPU processor 235) Root-of-Trust can be configured to assist in creating a random key unique to device 200 that personalizes the device and authenticates the device 200 with the device power-up.

In some embodiments, the hardware Root of Trust (ROT) code is integrated into the monolithic silicon of the IC (CPU processor 235) and is an isolated execution environment within the IC that boots from immutable code in mask ROM (240), is cryptographically personalized to each IC (e.g., ASIC), and will prevent the IC from performing its core function (e.g., switching packets) until two requirements are met. First, the ROT code must be able to find and authenticate an identity (e.g., a vendor-based identity) in the form of an X.509 certificate (or like certification), similar to a SUDI certificate in format but different in content in that this is an ASIC identity rather than a system identity and stored in the ASIC's companion Serial Peripheral Interface (SPI) Flash 210.

In some embodiments, the eFuse and a TRNG-based mechanism are implemented to create a unique and reproducible device-specific random number generator. The SPI Flash 210 may store the Secure Unique Device Identifier, or SUDI, which is an X.509v3 certificate that maintains the product identifier and serial number. The identity is implemented at manufacturing and is chained to a publicly identifiable root certificate authority. The CPU processor 235 in the isolated ROT CPU Complex 230 will enable CPU crypto hardware functions with crypto algorithms. SPI Flash 210 is used to store the intermediate firmware 220 states or control flags. A dedicated CPU Complex (e.g., the isolated ROT CPU Complex 230) is provided for device security (instead of reusing an existing CPU processor). In some embodiments, the CPU configuration will be the same as other CPU processors (of a device) along with dedicated ROM 240. This ROM 240 will contain SBOOT0 code and will be used to boot up (device-security) CPU processor 235. The device security of the CPU processor 235 is configured to execute security code and is secured from side-channel attacks such as through other interfaces to (1) either reset/halt the core or (2) change the program pointer. Also, if needed the firmware 220 can be configured for control and statuses can be stored in a unified data repository or records (UDR) to prevent attacks.

In some embodiments, the SUDI certificate is encrypted with a chip-specific key and stored in SPI Flash 210. The firmware code is provided from SPI flash, which is authenticated first before use. In some embodiments, the implementation of device 200 is by authentication through mailbox 250 for some devices (devices without an SPI master interface).

Figure 3:
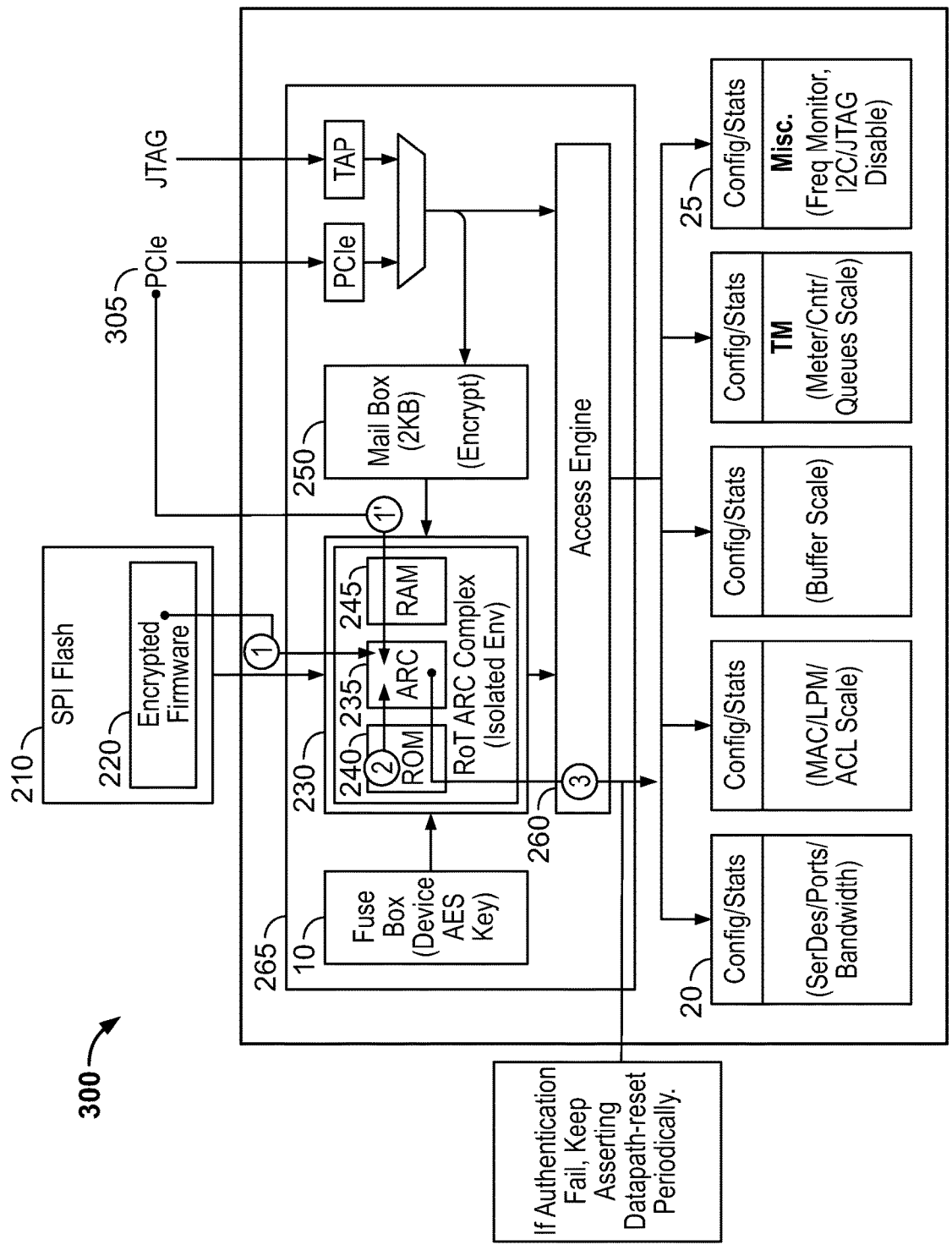
FIG. 3 illustrates a system architecture diagram that includes authentication, monitoring, and validating processes by the ROT code for monitoring various performance components or features of operations of a device and the IC according to some embodiments

FIG. 3 illustrates a diagram that includes an authentication (or validation) process for authenticating or validating the operability of the device 300 according to some embodiments. In FIG. 3, at step 1, the peripheral connect interface express (PCIe) 305 via 1', or the firmware provides code for authentication and/or validation of operating features configured with the device before or upon the device being enabled, or during a boot procedure. In step 2, the built-in keys from the fuse box are read by the ROT, and then in step 3, the CPU processor 235 authenticates (or validates) and decrypts the firmware code (from the encrypted firmware 220) from the SPI Flash 210 to execute the firmware code at the access engine. If this authentication fails, the ROT will reset the data path and retry the authentication or validation operation continuously or periodically or proceed to impair certain functionality of the IC.

Figure 4:
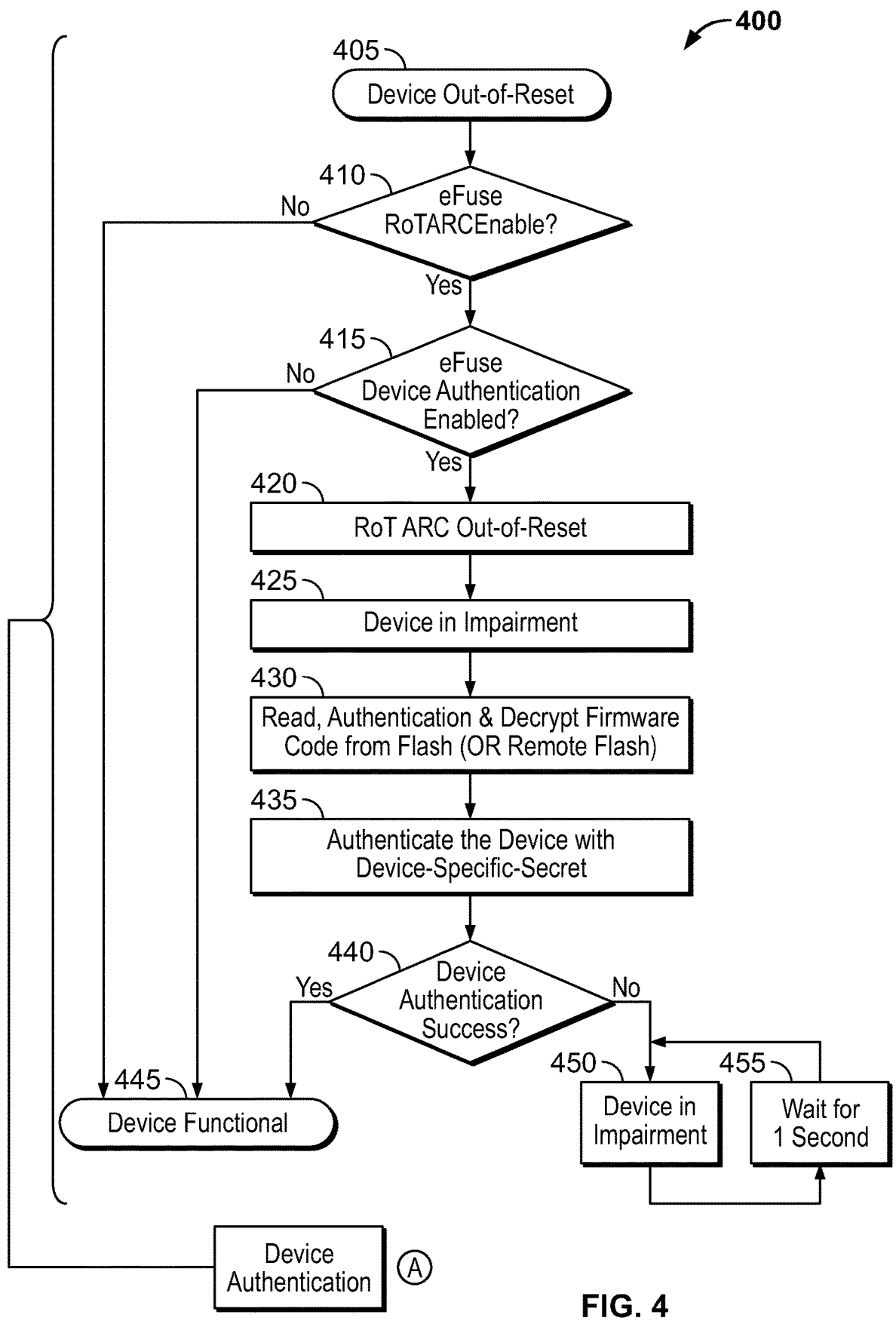
FIG. 4 illustrates a flow diagram of the authentication, monitoring, and validation process in FIG. 3 that enables impairments to the IC according to some embodiments.

FIG. 4 illustrates a flow diagram of the authentication, monitoring, and validation process in FIG. 3 that enables impairments to the IC according to some embodiments. In FIG. 4, in process 400 for the device authentication, at step 405, device 200 is initially in an out-of-reset status. Also, included in the authentication step 405, is a validation of the features and functionalities of the IC complies with a policy defined by a specification in use or license that is installed or being subscribed by the device for ongoing operations.

At step 410, the eFuse mechanism for the device authentication "A" is enabled (e.g., the eFuse ROT CPU enable is enabled or not?). If the eFuse device authentication is enabled then at step 420, the ROT CPU is out of reset. At step 425, the device impairment is disabled or interrupted to allow for the device ATE/qualification access to be completed. At step 430, it is configured to read, authenticate, and decrypt using firmware code from the Flash memory (or remote Flash memory) takes place. At step 435, the device is authenticated with the Device-Specific-Secret. At step 440, the device authentication is checked, if it is successful then at 445 the device is enabled, else at step 450, the device is placed in impairment, and a wait period 455 is triggered of about 1 second or other desired time period. If at step 410, the eFuse ROT CPU is not enabled, or the eFuse device authentication is not enabled at 415, then the flow continues to step 445, and the device is functional. In other embodiments, with continuous monitoring, the device may be placed in impairment for certain functionalities or operations semi-permanently, or permanently during the lifetime of operation of the IC as a safeguard to future tampering or attempts to tamper with the IC.

Figure 5:
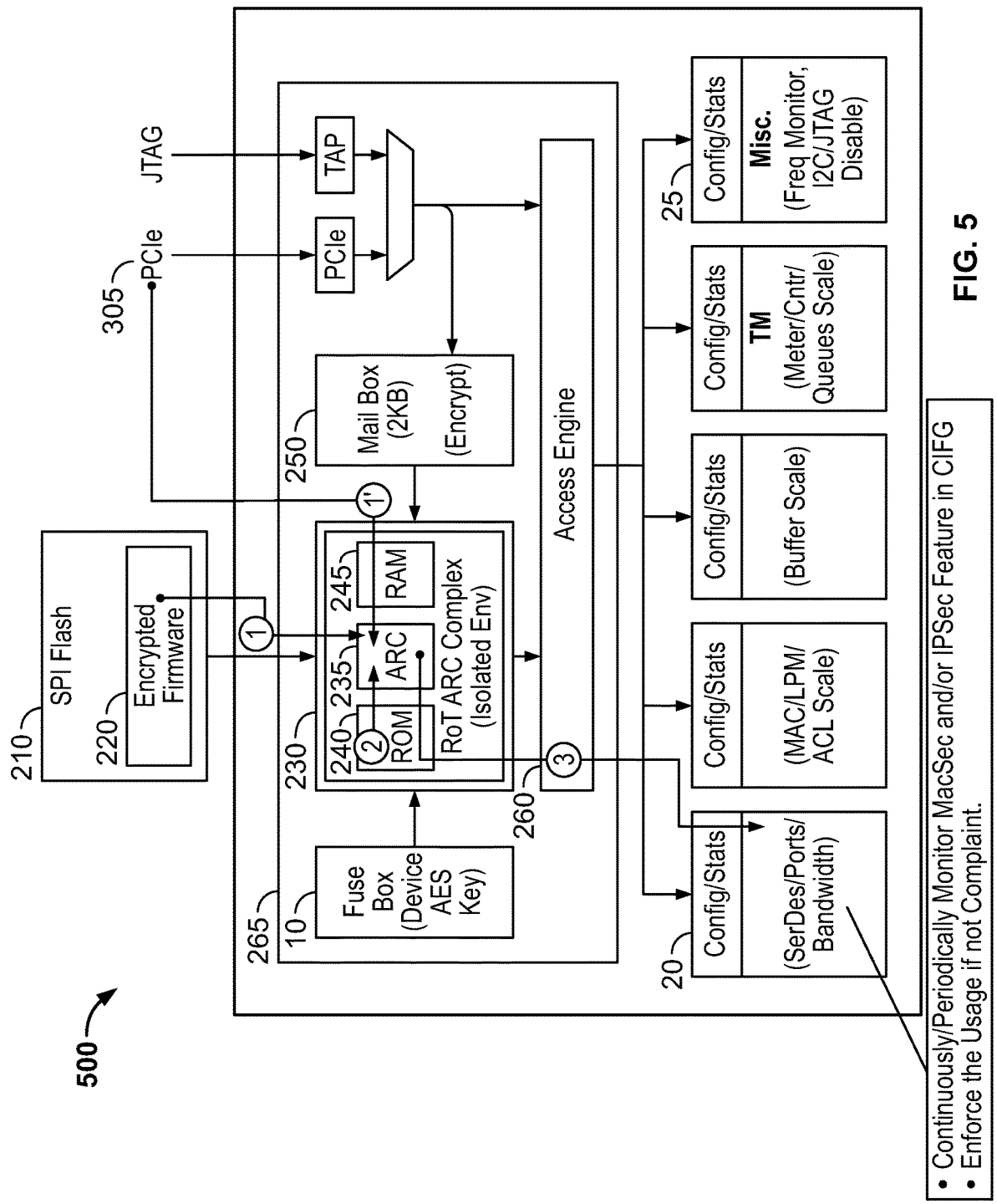
FIG. 5 illustrates a diagram of a device that is configured to operate in accordance with a license or policy based on a specification of features, and validation script, and a disabling (impairing) crypto-disable license stored locally or received externally for selective processor functions according to some embodiments.

FIG. 5 illustrates a device that is configured to operate in accordance with a license or policy based on a specification of features, and validation script, and a disabling (impairing) crypto-disable license stored locally or received externally for selective processor functions according to some embodiments. In FIG. 5, in the diagram of device 500, the CPU processor 235 is configured to receive crypto disable license that is stored in the SPI Flash 210 at step 1 and decrypt the crypto-disable license using built-in keys stored in the fuse box 10 (e.g., eFuse configured in manufacture) or at step 1' receive the crypto-disable license at Mailbox 250 sent from an external host via the PCIe 305. Once, the crypto-disable license is read using the built-in keys at step 2; the ROT instructs the CPU processor 235 at step 3, to selectively enable MacSec or IPsec via the activity engine 260, and periodically (or continuously) monitor the config/stat in the CIFG and enforce usage if not compliant. In some embodiments, the IC or the SOC is impaired when not in compliance, and a crypto-disable license or the ROT impairs features of the IC. For example, certain features may be impaired for export requirements.

Figure 6:
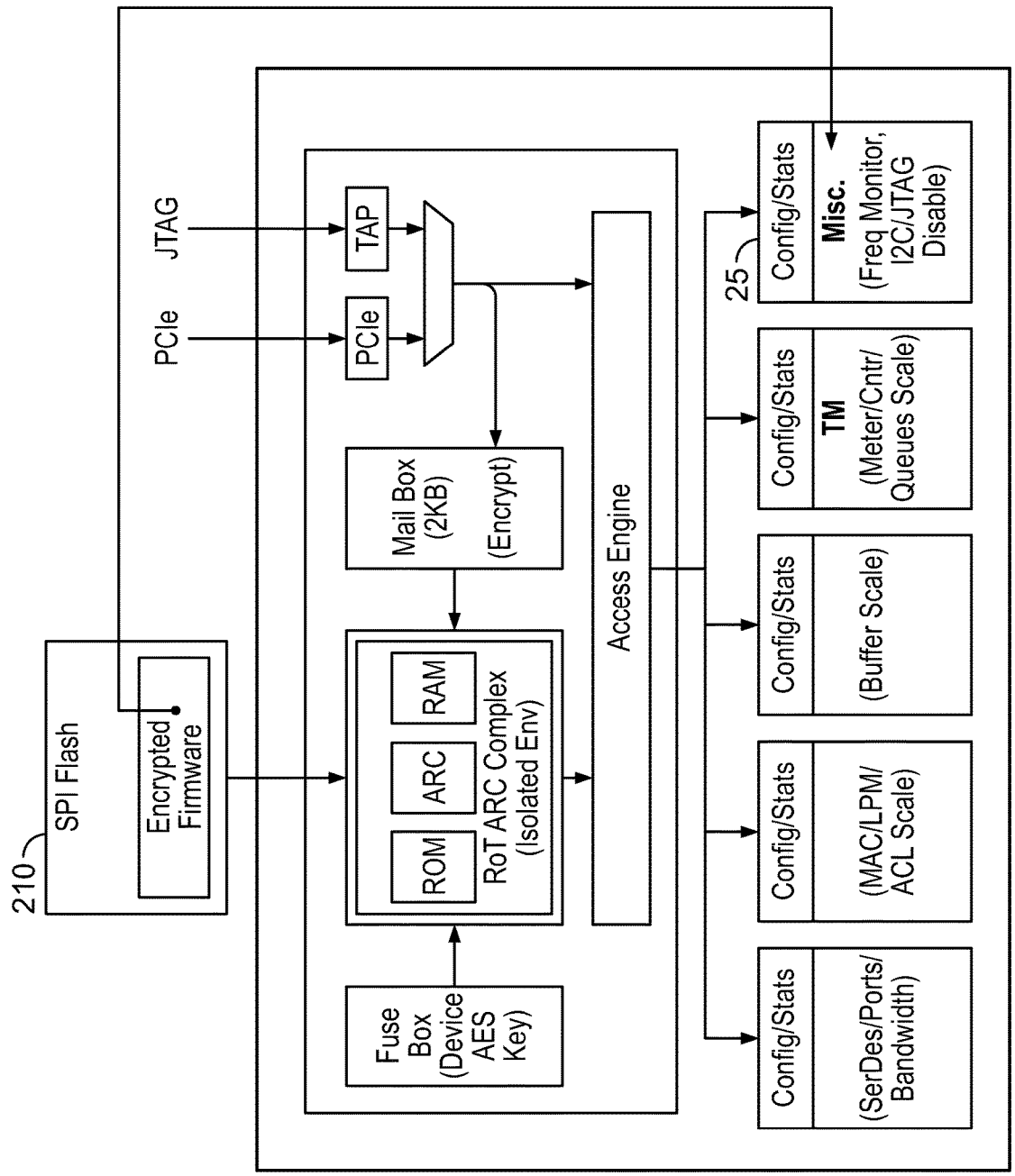
FIG. 6 illustrates a diagram of an exemplary model for device frequency control per a policy subscribed for different operating frequencies of the device according to some embodiments.

FIG. 6 illustrates a diagram of an exemplary model for device frequency control per a policy subscribed for different operating frequencies of the device according to some embodiments. In FIG. 6, the licenses enabled (or ongoingly monitored) by the encrypted firmware (of the SPI Flash 210) for different operating frequencies of the device 200 (e.g., 250 MHz, 500 MHz, 1G) via config/stats 20, 25 are enabled, and monitored to enforce the core frequencies chosen continuously or periodically by the ROT.

Figure 7:
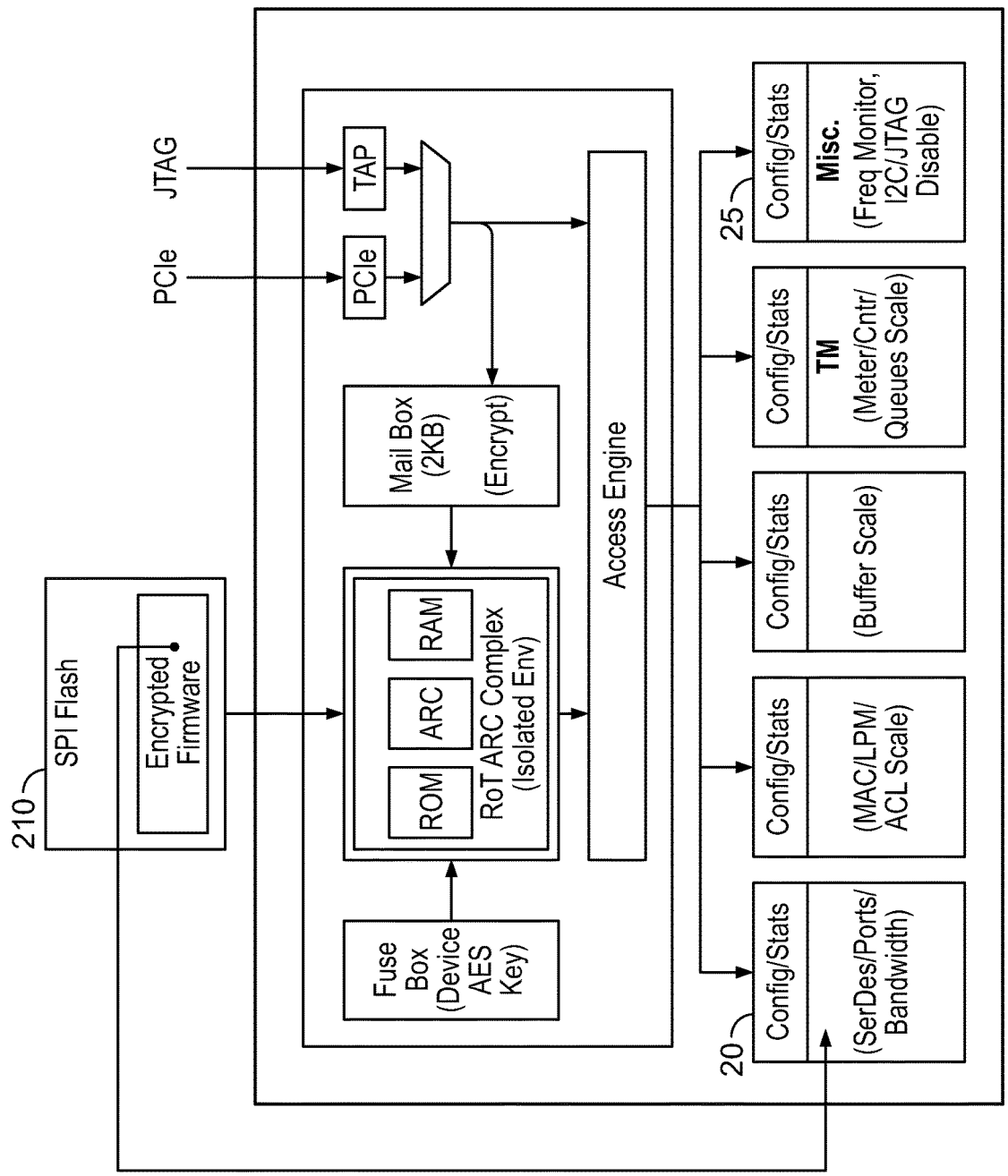
FIG. 7 illustrates a diagram of an exemplary model for device port control enabled or impaired per a policy for different operating modes that are configured with different numbers of ports enabled or impaired (e.g., not enabled) and/or the speed of the device is adjusted according to some embodiments.

FIG. 7 illustrates a diagram of an exemplary model for device port control enabled or impaired per a policy for different operating modes that are configured with different numbers of ports enabled or impaired (e.g., not enabled) and/or the speed of the device is adjusted according to some embodiments. In FIG. 7, the ROT impairs features of the IC in ongoing operations using the firmware from the SPI Flash 210) for different configurations of ports and speeds (e.g., 10G, 25G, 50G, etc.). In some embodiments, the ROT continuously or periodically monitors and enforces based on compliance with a policy or license for one or more of the intended use Serializer/Deserializer/Ports and speeds for each licensed configuration that is enabled (not impaired) via the config/stats 20, 25. Updated or new data on configurations that are allowed per a policy or a license that is subscribed or defined in a specification can be updated or received from a host via a JTAG that can be connected to communicate with the ROT.

Figure 8:
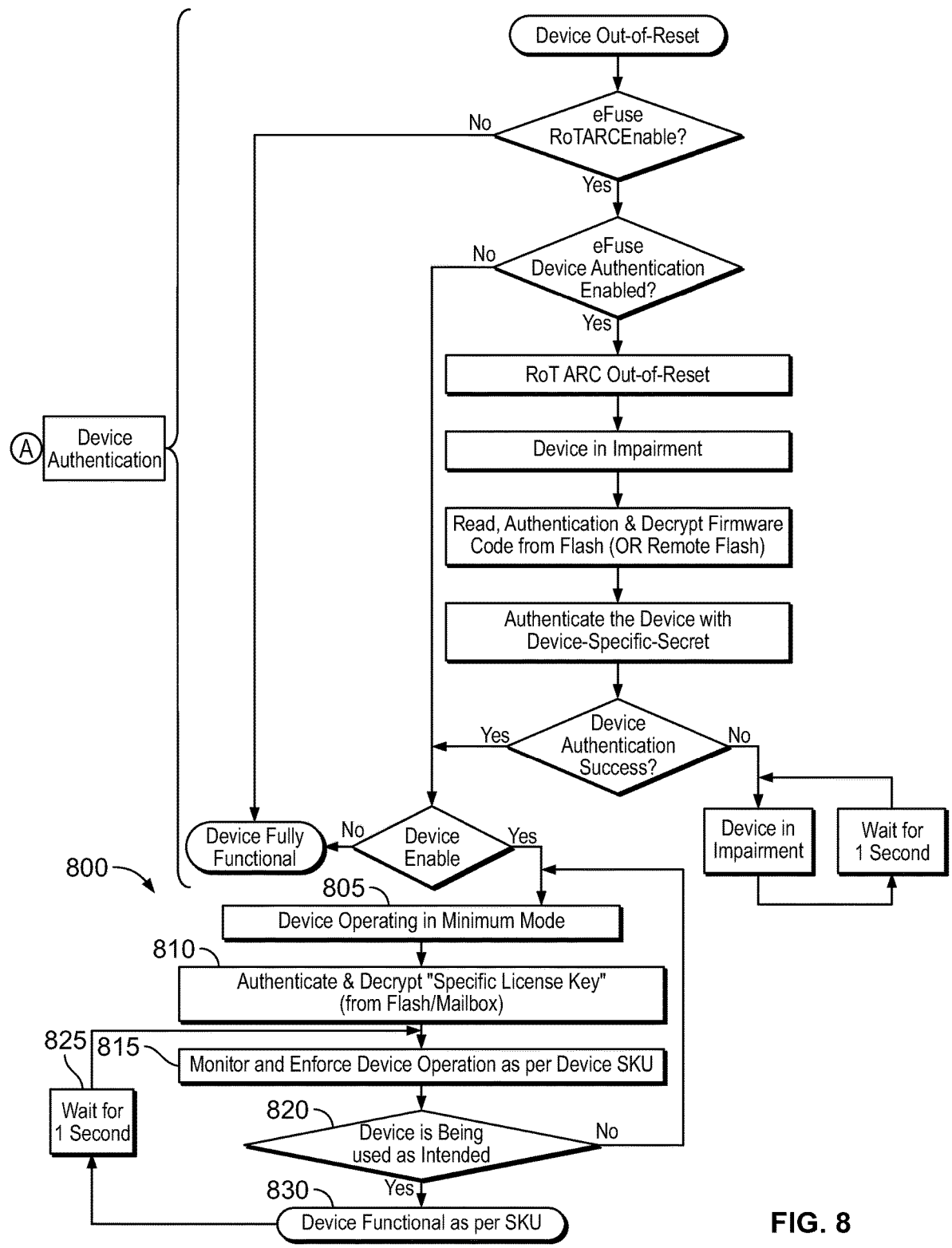
FIG. 8 is a diagram of an exemplary flow of the ongoing operational monitoring and determining of the IC feature configurations for the device authentication of FIG. 4 according to some embodiments.

FIG. 8 is a diagram of an exemplary flow of the ongoing operational monitoring and determining of the IC feature configurations for the device authentication of FIG. 4 according to some embodiments. In FIG. 8, the flow chart 800 illustrates a device 200 that is productized with multiple variations of a crypto feature enabled, overall device throughput (operating frequency), number of ser/des/ethernet ports and speeds, and MAC/LPM/ACL queues, etc., The different licensed configurations that are enabled can be created with the device 200 and IC/ASIC features enabled to provide feature variations that are decided per a policy without preplanning during production.

In some instances, the delivery of authenticated and encrypted firmware code to enable/disable features even in a zero-trust environment, and the device variation on the same IC/ASIC in use without device changes can be provided by the use of continuous or periodic monitoring of ongoing operations of the IC by the ROT. Since the eFuse is enabled for built-in key authentications, and not for controls, the eFuse-based controls are not used, and the ASIC features of the device can be implemented on demand. In FIG. 8, after the device is enabled and functional via the authentication "(A)" (Sec. FIG. 4) and can be considered a device not impaired and enabled, then at step 805, the device is placed in operation with a minimum, default or complete mode of operation.

At step 810, an authenticate and decrypt operation is applied using a specific license key received from the SPI Flash 210 during the continuous monitoring mode of operation of the ROT module of IC features that have been enabled. At step 815, the ROT monitors and enforces device operation for compliance with the policy or license used in ongoing operations of the IC. The ROT determines at step 820 if the device is operating or used as intended if not then the flow reverts to reauthenticate the device. If it is (e.g., used as intended), then at step 830 the device is allowed to operate as determined per a particular policy or license, and after a period of time (e.g., at step 825, for 1 sec or other desired period), the device is monitored, and operation is enforced (cyclically) per its license or policy. The cycle repeats as long as the device operates under a particular license or policy. In this way, device security is achieved, and compliance with a policy-specific operation is enabled without device tracking. Also, the license-specific key can be sent through the PCIe which is locally stored on the customer's local host along with its policy or specification defining compliance of ongoing operations of the IC. Also, the policy can be enabled by enabling all the features without the need for license-specific keys, a license-specific key per device, and a license-specific key per group of devices (e.g., per customer) may be enabled for allowing certain features or impairing certain features during modes of operation.

Figure 9:
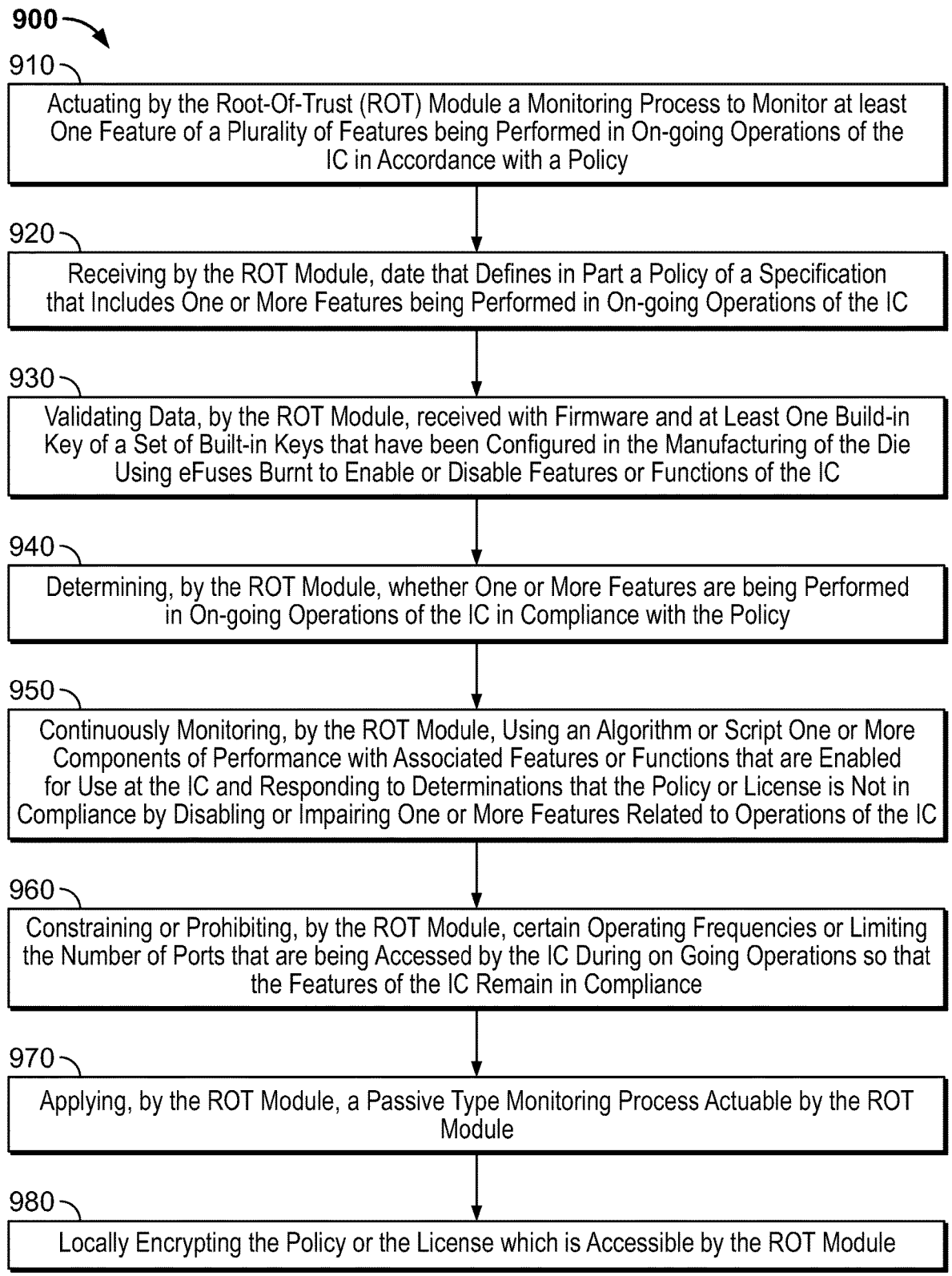
FIG. 9 is an exemplary flowchart of an example method of monitoring features performed in the ongoing operations of the IC in accordance with a policy by the ROT in the performing of ongoing operations of the IC, according to some embodiments.

FIG. 9 is an exemplary flowchart 900 of an example method of monitoring features performed in ongoing operations of the IC in accordance with a policy by the ROT in the performing of ongoing operations of the IC, according to some embodiments. At step 910, the example method for operating and monitoring an IC or a system-on-chip (SOC) includes actuating, by a Root-Of-Trust (ROT) module operably configured with the IC, a monitoring process to monitor at least one feature of a plurality of features being performed in ongoing operations of the IC in accordance with a policy. At step 920, the ROT module may receive data that defines in part a policy of a specification that includes one or more features being performed in the ongoing operations of the IC. As an example, the ROT may decrypt a code that is enabled in a zero trust or isolated environment of an ROT CPU complex received from a host during the bootup of a device that executes a script, computer code, or algorithm that applies a monitoring process of one or more features of a set of features that are operating at the IC. As an example, the ROT code may receive a one-time as part of an authenticated ROT forward (FW) image, that defines a specification or license of certain features operating at the IC.

At step 930, the ROT module validates the license code or data received with firmware and at least one built-in key of a set of built-in keys that have been configured in the manufacturing of the die using eFuses burnt to enable or disable features or functions of the IC or ASIC and the built-in keys are encrypted in secure storage with various encryption methods. The secure storage may be a fuse box.

At step 940, the ROT module determines, based in part on validating the data received that defines the policy, whether one or more features are being performed in the ongoing operations of the IC in compliance with the policy. This determination may be based in part on a configuration or enabled on-chip resources that are being used as part of a specification for operating the features of the IC based on a policy and updates of the policy which has been decrypted by the ROT in the isolated environment using at least one built-in key and authenticated by firmware. As an example, the ROT may configure on-chip resources to achieve compliance per the license or policy (e.g., disable or impair hardware-accelerated crypto so IC can be exported). At step 950, the ROT module while continuously monitoring by an algorithm or script one or more components of performance with associated features or functions that are enabled for use at the IC, responds to determinations that the policy or license is not in compliance to disable or impair one or more features of the IC.

At step 960, as an example, the ROT module may constrain certain frequencies or prohibit certain operating frequencies of the IC. Similarly, the ROT module may limit any number of ports that are being accessed by the IC during ongoing operations so that the features of the IC remain in compliance. At step 970, the ROT module may apply a passive type monitoring process or a non-passive monitoring process where both types may be actuable by the ROT module. At step 980, the policy or the license code is locally encrypted and stored, and readable by the isolated ROT code with firmware stored in flash memory. Each built-in key has been configured by at least one electrical programmable fuse (eFuse) burnt in a manner to at least disable one or more features of the IC.

Figure 10:
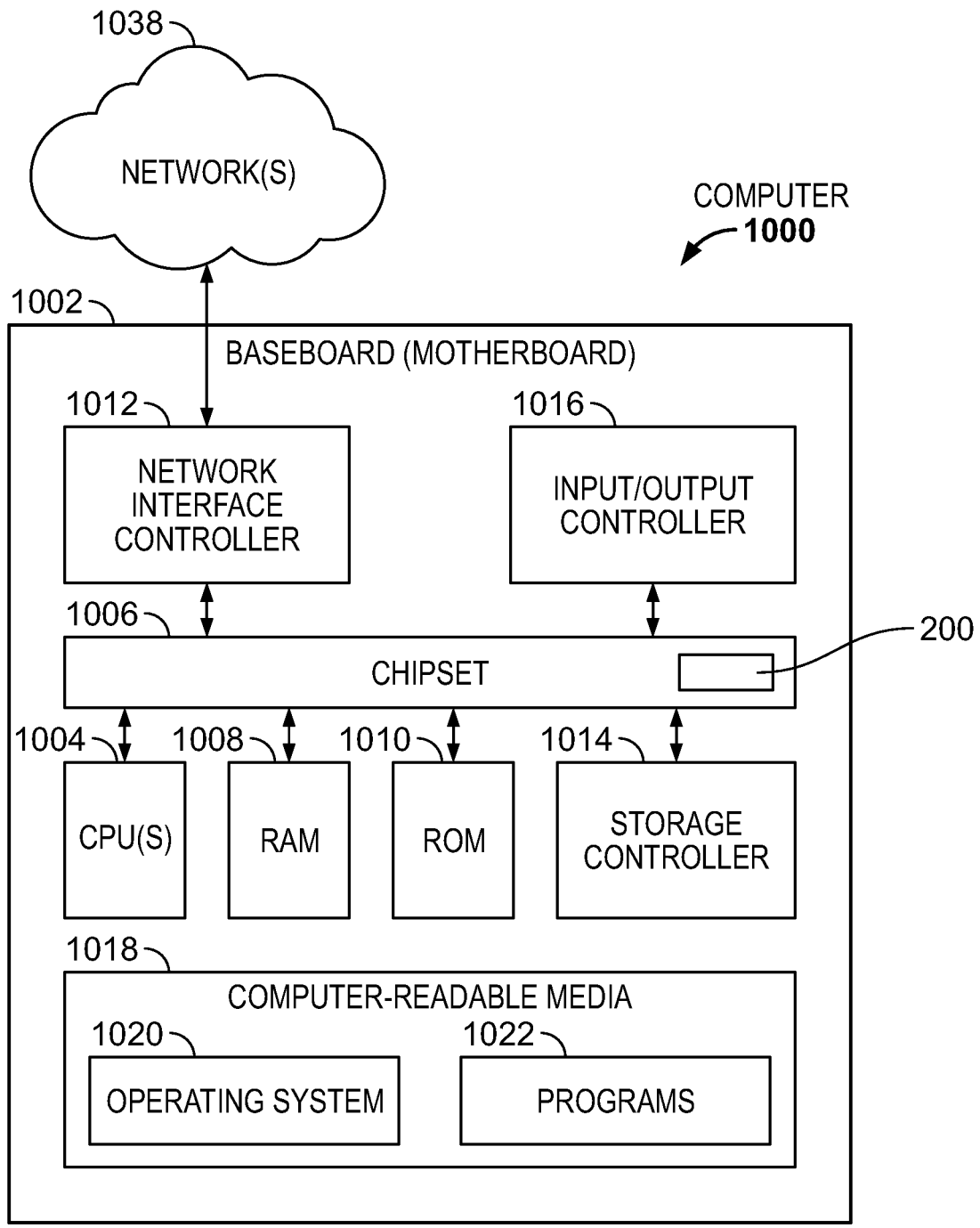
FIG. 10 illustrates a computer architecture diagram showing an example of computer hardware architecture for implementing a computer that has a chipset that integrates the isolated ROT CPU complex (e.g., the isolated environment) of FIGS. 2-3 and 6-8, and is utilized to implement aspects of the various technologies presented herein.

FIG. 10 illustrates a computer architecture diagram showing an example of computer hardware architecture for implementing a computer that has a chipset that integrates the zero-trust environment and is utilized to implement aspects of the various technologies presented herein. The computer hardware architecture with a computer 1000 connected to a network 1038 is shown in FIG. 10 with a chipset 1006 that incorporates or integrates the device 200 that includes the various elements of the isolated ROT CPU Complex 230 with the fuse box 10, the mailbox 250, the access engine 260, the CIFG 20, the SPI Flash 210 storing the encrypted firmware 220, and the other components described in FIGS. 1-3, and 5-7.

The chipset 1006 provides an interface between the CPU(s) 1004 and the remainder of the components and devices on the baseboard 1002. The chipset 1006 may provide an interface to a RAM 1008, used as the main memory in the computer 1000. The chipset 1006 may further provide an interface to a computer-readable storage medium such as read-only memory (ROM) 1010 or non-volatile RAM (NVRAM) for storing basic routines that help to startup the computer 1000 (and is separate from the ROM and RAM of the isolated ROT CPU Complex 230) and to transfer information between the various components and devices. The ROM 1010 or NVRAM may also store other software components necessary for the operation of the computer 1000 in accordance with the configurations described herein.

The computer 1000 includes a baseboard 1002, or "motherboard," which is a printed circuit board to which a multitude of components or devices may be connected by way of a system bus or other electrical communication paths. In one illustrative configuration, one or more central processing units (CPUs) 1004 operate in conjunction with a chipset 1006 and the device 200 including the isolated ROT CPU Complex 230, the fuse box 10, the mailbox 250, and the firmware 220 (e.g., components of the SOC 265). The CPU 1004 may be a standard programmable processor that performs arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer 1000 may operate in a networked environment using logical connections to remote computing devices and computer systems through a network. The computer 1000 may be connected to a storage device 1018 that provides non-volatile storage for the computer. The storage device 1018 (separate from the secure storage (e.g., Fuse box 10, Mailbox 250) may store an operating system 1020, programs 1022 (e.g., any algorithm, script, and computer-readable and/or computer-executable code described herein), and data, which have been described in greater detail herein. The storage device 1018 may be connected to the computer 1000 through a storage controller 1014 connected to the chipset 1006. The storage device 1018 may consist of one or more physical storage units. The storage controller 1014 may interface with the physical storage units through a serial attached SCSI (SAS) interface, a serial advanced technology attachment (SATA) interface, a fiber channel (FC) interface, or another type of interface for physically connecting and transferring data between computers and physical storage units.

The computer 1000 may store data on the storage device 1018 by transforming the physical state of the physical storage units to reflect the information being stored. The specific transformation of the physical state may depend on various factors, in different examples of this description. Examples of such factors may include but are not limited to, the technology used to implement the physical storage units, whether the storage device 1018 is characterized as primary or secondary storage, and the like.

For example, computer 1000 may store information the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the storage device 1018 by detecting the physical states or characteristics of one or more particular locations within the physical storage units.

In addition to the storage device 1018 described above, the computer 1000 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 1000

By way of example, and not limitation, computer-readable storage media may include volatile and non-volatile, removable, and non-removable media implemented in any method or technology. Computer-readable storage media includes but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 1018 may store an operating system 1020 utilized to control the operation of the computer 1000. According to one example, the operating system 1020 comprises the LINUX operating system. According to another example, the operating system comprises the WINDOWS® SERVER operating system from MICROSOFT® Corporation of Redmond, Washington. According to further examples, the operating system may comprise the UNIX® operating system or one of its variants. It may be appreciated that other operating systems may also be utilized. The storage device 1018 may store other system or application programs and data utilized by the computer 1000.

In one example, the storage device 1018 or other computer-readable storage media is encoded with computer-executable instructions which, when loaded into the computer 1000, transform the computer from a general-purpose computing system into a special-purpose computer capable of implementing the examples described herein. These computer-executable instructions transform the computer 1000 by specifying how the CPUs 1004 transition between states, as described above. According to one example, the computer 1000 has access to computer-readable storage media storing computer-executable instructions which, when executed by the computer 1000, perform the various processes described above with regard to FIGS. 1 through 9. The computer 1000 may also include computer-readable storage media having instructions stored thereupon for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, an input/output controller 1016 may provide output to a display, such as a computer monitor, a flat-panel display, a digital projector, a printer, or other type of output device. It will be appreciated that the computer 1000 might not include all of the components shown in FIG. 10, may include other components that are not explicitly shown in FIG. 10, or might utilize an architecture completely different than that shown in FIG. 10.

The computer 1000 may include one or more hardware processor(s) such as the CPUs 1004 configured to execute one or more stored instructions. The CPUs 1004 may comprise one or more cores. Further, the computer 1000 may include one or more network interface controllers 1012 (with network interfaces) configured to provide communications between the computer 1000 and other devices, such as the communications described herein. The network interface controllers 1012 may be coupled with or include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth. Program 1022 may comprise any type of program or process to perform the techniques described in this disclosure. Program 1022 may enable the devices described herein to perform various operations.

The examples described herein provide systems and methods that may utilize an isolated ROT code with built-on keys provided in a trust zone environment for authentication and monitoring operations within the IC, ASIC, or SOC.

Clause 1. A method for monitoring an Integrated Circuit (IC), comprising: actuating, by a Root-Of-Trust (ROT) module operably configured with the IC, a monitoring process to monitor at least one feature of a plurality of features being performed in ongoing operations of the IC in accordance with a policy; receiving, by the ROT module, data that defines in part the policy of a specification that comprises at least one feature of the plurality of features being performed in ongoing operations of the IC; applying a validating process, by the ROT module, of the data by using instructional code from firmware accessed by the ROT module and by using at least one built-in key of a plurality of built-in keys retrieved from a secure storage; determining, by the ROT module, based in part on validating of the data, whether the at least one feature of the plurality of features is being performed in ongoing operations of the IC in compliance with the policy; and applying, by the ROT module, an impairing process to impair at least one feature of the plurality of features being performed, to respond to determining that the policy is not in compliance, and to attempt to place performance of the ongoing operations of the IC in compliance with the policy.

Clause 2. The method of clause 1, further comprising: actuating, by an ROT module, the monitoring process during at least one of a boot-up feature of the IC or features in ongoing operations of the IC.

Clause 3. The method of clause 1, wherein the monitoring process for at least one feature of the IC comprises at least one of a continuous monitoring of one or more features in ongoing operations of the IC or a periodic monitoring of one or more features in ongoing operations of the IC.

Clause 4. The method of clause 1, wherein the monitoring process for at least one feature of the IC comprises at least one of a passive monitoring process, or a non-passive monitoring process that is actuable by the ROT module.

Clause 5. The method of clause 1, wherein the monitoring process comprises an algorithm actuable by the ROT module that is configured to monitor at least one feature of the IC or a plurality of features being performed in ongoing operations of the IC.

Clause 6. The method of clause 1, wherein the IC comprises at least one of a System-On-a-Chip (SOC) or an Application-Specific Integrated Circuit (ASIC).

Clause 7. The method of clause 1, wherein the ROT module is configured to receive at least one of new data or updated data related to the policy from a host during a boot-up feature of the IC or in ongoing operations of the IC for determining compliance of features being performed by the IC.

Clause 8. The method of clause 1, wherein at least one built-in key accessed by the ROT module comprises an electrically programmable fuse (eFuse) configured during manufacturing of the IC, wherein the eFuse is actuable by the ROT module to impair at least one feature of the IC during ongoing operations of the IC.

Clause 9. The method of clause 1, wherein the impairing process further comprising: impairing, by the ROT module, at least one feature of the IC to enable operating the IC in at least a mode comprising a subset of features that is in compliance with the policy.

Clause 10. The method of clause 1, wherein the IC is impaired by the ROT to operate with a constraint of at least one of a frequency of a set of frequencies associated with performing one or more features in ongoing operations of the IC, or a limitation of use of a port of a set of ports enabled for ongoing operations of the IC.

Clause 11. The method of clause 1, wherein the data related to the policy is locally encrypted and stored and is readable by firmware stored in memory by the ROT module.

Clause 12. A non-transitory computer-readable medium comprising an isolated Root of Trust (ROT) code storing instructions that, when executed by a processor, cause the processor to: monitor at least one feature of a plurality of features being performed in ongoing operations of an integrated circuit (IC) in accordance with a policy; receive data that defines in part the policy of a specification that comprises at least one feature of the plurality of features being performed in ongoing operations of the IC; in response to receiving data, validate the data by using instructional code from firmware and by using at least one built-in key of a plurality of built-in keys retrieved from a secure storage; determine based in part on validation of the data, whether the at least one feature of the plurality of features being performed in ongoing operations of the IC is in compliance with the policy; and impair at least one feature of the plurality of features being performed in ongoing operations of the IC in response to a determination that the policy is not in compliance in order to attempt to place one or more features being performed in ongoing operations of the IC in compliance with the policy.

Clause 13. The non-transitory computer-readable medium of clause 12, wherein the processor is configured to monitor at least one feature of the IC which is actuated by at least one of a boot up of the IC or being performed during ongoing operations of the IC.

Clause 14. The non-transitory computer-readable medium of clause 12, wherein the processor is configured to monitor at least one feature of the IC by performing at least one of a continuous monitoring of one or more features being performed in ongoing operations of the IC or a periodic monitoring of one or more features being performed in ongoing operations of the IC.

Clause 15. The non-transitory computer-readable medium of clause 12, wherein the processor is configured to initiate monitoring of at least one feature being performed at one of the boot-up of the IC, or during ongoing operations of the IC.

Clause 16. The non-transitory computer-readable medium of clause 12, wherein the processor is configured to monitor at least one feature of the IC being performed by at least a passive monitor process.

Clause 17. The non-transitory computer-readable medium of clause 12, wherein the processor is configured to apply an algorithm to monitor at least one feature of the IC or a plurality of features being performed in ongoing operations of the IC and to receive at least one of new data or updated data from a host at a boot up of the IC or during at least one feature being performed in ongoing operations of the IC.

Clause 18. The non-transitory computer-readable medium of clause 12, wherein at least one built-in key comprises an electrically programmable fuse (eFuse) configured during manufacturing of the IC, wherein the eFuse is actuable to impair at least one feature of the IC being performed during ongoing operations of the IC.

Clause 19. The non-transitory computer-readable medium of clause 12, wherein the IC is impaired by the ROT to operate with a constraint of at least one of a frequency of a set of frequencies associated with performing one or more features in ongoing operations of the IC, or a limitation of use of a port of a set of ports enabled for ongoing operations of the IC.

Clause 20. A computing device comprising: a processor; and a non-transitory computer-readable media storing instructions comprising Root-Of-Trust (ROT) code that, when executed by the processor, causes the processor to perform features comprising: actuating a monitoring process to monitor at least one feature of a plurality of features in ongoing operations of an Integrated Circuit (IC) in accordance with a policy; receiving data that defines in part the policy of a specification that comprises at least one feature of the plurality of features in ongoing operations of the IC; applying a validating process of the data by using instructional code from firmware accessed and by using at least one built-in key of a plurality of built-in keys retrieved from a secure storage; determining based in part on validating of the data, whether the at least one feature of the plurality of features is being performed in ongoing operations of the IC in compliance with the policy; and applying an impairing process to impair at least one feature of the plurality of features being performed, to respond to determining that the policy is not in compliance, and to attempt to place performing of the ongoing operations of the IC in compliance with the policy.

While the present systems and methods are described with respect to the specific examples, it is to be understood that the scope of the present systems and methods is not limited to these specific examples. Since other modifications and changes varied to fit particular operating requirements and environments will be apparent to those skilled in the art, the present systems and methods are not considered limited to the example chosen for purposes of disclosure and cover all changes and modifications that do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method for monitoring an Integrated Circuit (IC), comprising:
actuating, by a Root-Of-Trust (ROT) module operably configured with the IC, a monitoring process to monitor at least one feature of a plurality of features being performed in ongoing operations of the IC in accordance with a policy;
receiving, by the ROT module, data that defines in part the policy of a specification that comprises at least one feature of the plurality of features being performed in ongoing operations of the IC;
applying a validating process, by the ROT module, of the data by using instructional code from firmware accessed by the ROT module and by using at least one built-in key of a plurality of built-in keys retrieved from a secure storage;
determining, by the ROT module, based in part on validating of the data, whether the at least one feature of the plurality of features is being performed in ongoing operations of the IC in compliance with the policy; and
applying, by the ROT module, an impairing process to impair at least one feature of the plurality of features being performed, to respond to determining that the policy is not in compliance, and to attempt to place performance of the ongoing operations of the IC in compliance with the policy.

2. The method of claim 1, further comprising:
actuating, by an ROT module, the monitoring process during at least one of a boot-up feature of the IC or features in ongoing operations of the IC.

3. The method of claim 1, wherein the monitoring process for at least one feature of the IC comprises at least one of a continuous monitoring of one or more features in ongoing operations of the IC or a periodic monitoring of one or more features in ongoing operations of the IC.

4. The method of claim 1, wherein the monitoring process for at least one feature of the IC comprises at least one of a passive monitoring process or a non-passive monitoring process that is actuable by the ROT module.

5. The method of claim 1, wherein the monitoring process comprises an algorithm actuable by the ROT module that is configured to monitor at least one feature of the IC or a plurality of features being performed in ongoing operations of the IC.

6. The method of claim 1, wherein the IC comprises at least one of a System-On-a-Chip (SOC) or an Application-Specific Integrated Circuit (ASIC).

7. The method of claim 1, wherein the ROT module is configured to receive at least one of new data or updated data related to the policy from a host during a boot-up feature of the IC or in ongoing operations of the IC for determining compliance of features being performed by the IC.

8. The method of claim 1, wherein at least one built-in key accessed by the ROT module comprises an electrically programmable fuse (eFuse) configured during manufacturing of the IC, wherein the eFuse is actuable by the ROT module to impair at least one feature of the IC during ongoing operations of the IC.

9. The method of claim 1, wherein the impairing process further comprising:
impairing, by the ROT module, at least one feature of the IC to enable operating the IC in at least a mode comprising a subset of features that is in compliance with the policy.

10. The method of claim 1, wherein the IC is impaired by the ROT to operate with a constraint of at least one of a frequency of a set of frequencies associated with performing one or more features in ongoing operations of the IC, or a limitation of use of a port of a set of ports enabled for ongoing operations of the IC.

11. The method of claim 1, wherein the data related to the policy is locally encrypted and stored and is readable by firmware stored in memory by the ROT module.

12. A non-transitory computer-readable medium comprising an isolated Root of Trust (ROT) code storing instructions that, when executed by a processor, cause the processor to:
monitor at least one feature of a plurality of features being performed in ongoing operations of an integrated circuit (IC) in accordance with a policy;
receive data that defines in part the policy of a specification that comprises at least one feature of the plurality of features being performed in ongoing operations of the IC;
in response to receiving data, validate the data by using instructional code from firmware and by using at least one built-in key of a plurality of built-in keys retrieved from a secure storage;
determine based in part on validation of the data, whether the at least one feature of the plurality of features being performed in ongoing operations of the IC is in compliance with the policy; and
impair at least one feature of the plurality of features being performed in ongoing operations of the IC in response to a determination that the policy is not in compliance in order to attempt to place one or more features being performed in ongoing operations of the IC in compliance with the policy.

13. The non-transitory computer-readable medium of claim 12, wherein the processor is configured to monitor at least one feature of the IC which is actuated by at least one of a boot up of the IC or being performed during ongoing operations of the IC.

14. The non-transitory computer-readable medium of claim 12, wherein the processor is configured to monitor at least one feature of the IC by performing at least one of a continuous monitoring of one or more features being performed in ongoing operations of the IC or a periodic monitoring of one or more features being performed in ongoing operations of the IC.

15. The non-transitory computer-readable medium of claim 12, wherein the processor is configured to initiate monitoring of at least one feature being performed at one of boot-up of the IC, or during ongoing operations of the IC.

16. The non-transitory computer-readable medium of claim 12, wherein the processor is configured to monitor at least one feature of the IC being performed by at least a passive monitor process.

17. The non-transitory computer-readable medium of claim 12, wherein the processor is configured to apply an algorithm to monitor at least one feature of the IC or a plurality of features being performed in ongoing operations of the IC and to receive at least one of new data or updated data from a host at a boot up of the IC or during at least one feature being performed in ongoing operations of the IC.

18. The non-transitory computer-readable medium of claim 12, wherein at least one built-in key comprises an electrically programmable fuse (eFuse) configured during manufacturing of the IC, wherein the eFuse is actuable to impair at least one feature of the IC being performed during ongoing operations of the IC.

19. The non-transitory computer-readable medium of claim 12, wherein the processor is configured to impair the IC to operate with a constraint of at least one of a frequency of a set of frequencies associated with performing one or more features in ongoing operations of the IC, or a limitation of use of a port of a set of ports enabled for ongoing operations of the IC.

20. A computing device comprising:
a processor; and
a non-transitory computer-readable media storing instructions comprising Root-Of-Trust (ROT) code that, when executed by the processor, causes the processor to perform features comprising:
actuating a monitoring process to monitor at least one feature of a plurality of features in ongoing operations of an Integrated Circuit (IC) in accordance with a policy;
receiving data that defines in part the policy of a specification that comprises at least one feature of the plurality of features in ongoing operations of the IC;
applying a validating process of the data by using instructional code from firmware accessed and by using at least one built-in key of a plurality of built-in keys retrieved from a secure storage;
determining based in part on validating of the data, whether the at least one feature of the plurality of features is being performed in ongoing operations of the IC in compliance with the policy; and
applying an impairing process to impair at least one feature of the plurality of features being performed, to respond to determining that the policy is not in compliance, and to attempt to place performing of the ongoing operations of the IC in compliance with the policy.

* * * * *